W. H. McMILLAN.
Sheave for Pulley-Blocks.

No. 217,393.                Patented July 8, 1879.

UNITED STATES PATENT OFFICE.

WILLIAM H. McMILLAN, OF BROOKLYN, NEW YORK.

IMPROVEMENT IN SHEAVES FOR PULLEY-BLOCKS.

Specification forming part of Letters Patent No. 217,393, dated July 8, 1879; application filed June 5, 1879.

*To all whom it may concern:*

Be it known that I, WILLIAM H. McMILLAN, of Brooklyn, in Kings county and State of New York, have invented certain new and useful Improvements in Sheaves for Pulley-Blocks, of which the following is a specification.

For the sheaves of pulley-blocks lignum-vitæ wood is preferred, as the rope wears much longer upon and is less liable to be cut by a lignum-vitæ sheave than one made of iron or other metal.

For the purpose of increasing their durability, such sheaves are usually provided with a bushing, through which the journal upon which the sheave rotates passes. It has been difficult to prevent this bushing from becoming loosened by the heating consequent upon the friction of the pulley on the pin or journal.

My invention consists in a wooden sheave provided with a bushing, in which is a bearing for the journal or pin, upon which the sheave may rotate, and which is pierced with a series of holes or perforations around said bearing, for permitting a free circulation of air through the bushing and preventing it from becoming greatly heated by the friction generated in its center bearing.

Figure 1:
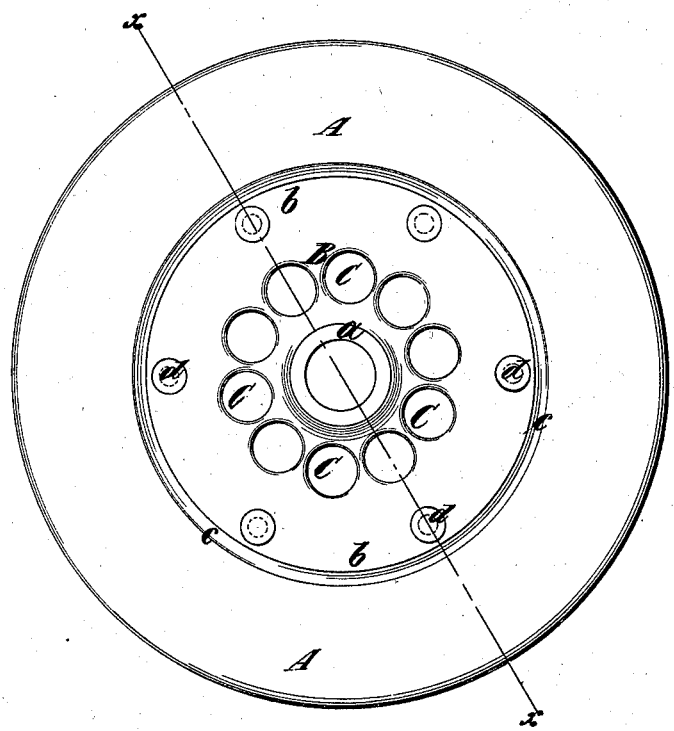
Figure 2:
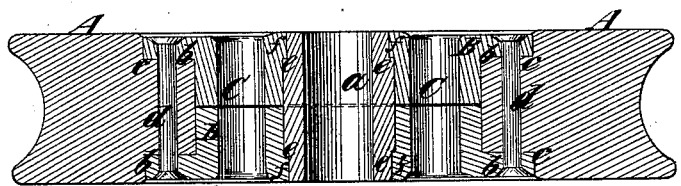

In the accompanying drawings, Figure 1 represents a face view of a sheave embodying my invention; and Fig. 2 is a transverse section on the line $x\,x$, Fig. 1.

Similar letters of reference designate corresponding parts in both figures.

A designates the body of the sheave, which is of lignum-vitæ or any other desirable wood. B designates a metal bushing, inserted and secured at the center of the sheave, and having at its center a bearing for the journal or pin upon which the sheave rotates.

For the purpose of making the sheave more durable this bearing is provided with a lining, $a$, of brass or other suitable metal.

The bushing B is here represented as divided transversely to its axis in halves, each of which is provided with a flange, $b$, overlapping the wood and fitting in a recess, $c$, in the side of the sheave. The two parts forming the bushing are represented as secured to the wood by rivets $d$ passing through both flanges $b$ and the wood body A.

The lining $a$ is represented as secured in the bushing by having its ends turned down, forming shoulders $e$, against which impinge ribs $f$ on the bushing B, and which is thus secured against transverse movement when the two parts of which the bushing is composed are fastened together.

C designates a series of holes or perforations extending through the bushing parallel with the journal-bearing, and placed circumferentially around the said bearing. These holes or perforations afford provision for an abundant circulation of air through the bushing, and thus prevent its becoming heated by the friction generated in its bearing, and prevent the heat thus generated from being transmitted to the portion of the bushing outside the circle of holes or perforations.

The expansion of my ventilated bushing is very much less than that of a solid bushing, and consequently the hole in the wood body A will not be enlarged by the expansion of the bushing sufficiently to cause it to become loose when the bushing contracts in cooling.

What I claim as my invention, and desire to secure by Letters Patent, is—

1. A wooden sheave provided with a metal bushing, in which is a bearing for the journal or pin, upon which the sheave may rotate, and which is pierced with a series of holes or perforations around said bearing, so as to afford provision for a circulation of air through the bushing, substantially as and for the purpose specified.

2. A wooden sheave provided with a metal bushing, composed of sections arranged on opposite sides thereof, provided with flanges, and secured by rivets or bolts passing through said flanges and the sheave, the said bushing being also provided with a bearing for the journal or pin, upon which the sheave may rotate, and with a series of holes or perforations around said bearing, substantially as and for the purpose specified.

W. H. McMILLAN.

Witnesses:
HENRY T. BROWN,
FREDK. HAYNES.